Feb. 9, 1954 W. G. HOELSCHER 2,668,557
CONDUIT SYSTEM FOR MACHINE TOOLS
Filed March 21, 1950 3 Sheets-Sheet 1

INVENTOR.
William G. Hoelscher
BY
Wood, Arey, Herron & Evans
ATTORNEYS.

Feb. 9, 1954  W. G. HOELSCHER  2,668,557
CONDUIT SYSTEM FOR MACHINE TOOLS
Filed March 21, 1950  3 Sheets-Sheet 2
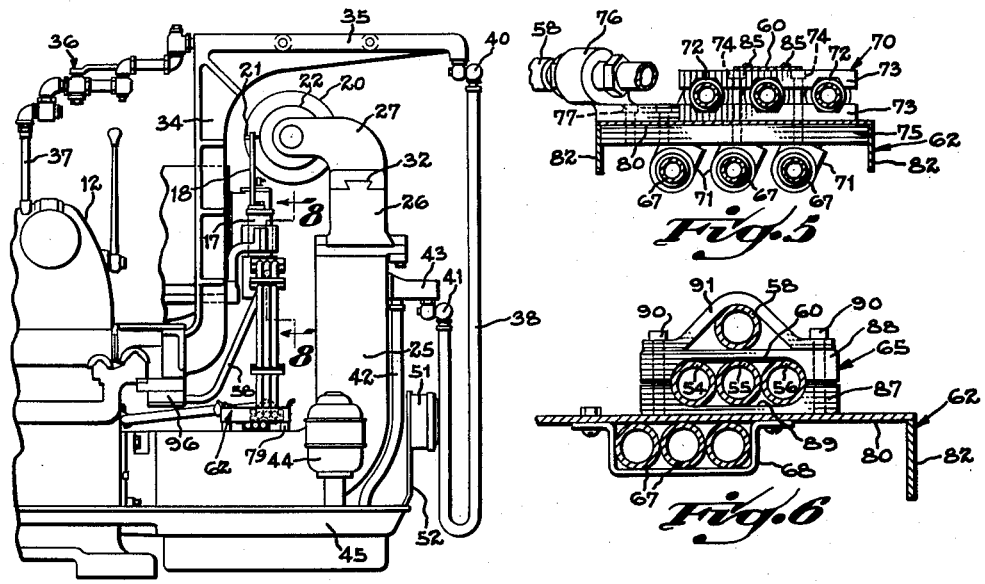
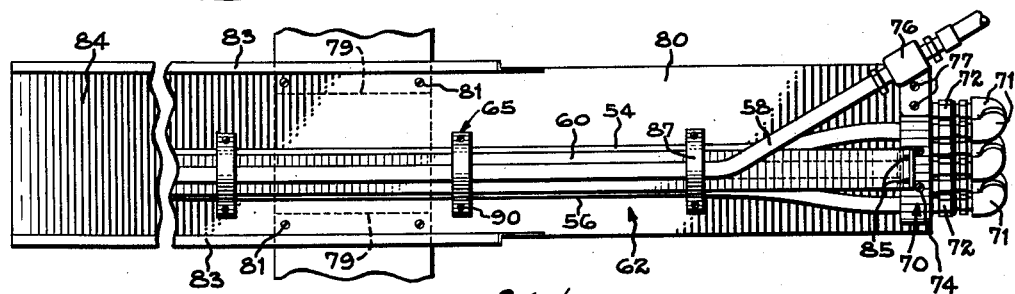
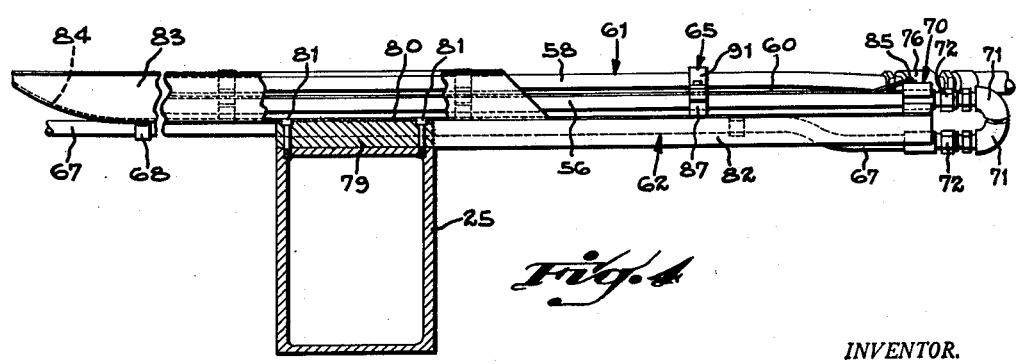
INVENTOR.
William G. Hoelscher
BY
Wood, Arey, Herron & Evans
ATTORNEYS.

Feb. 9, 1954 W. G. HOELSCHER 2,668,557
CONDUIT SYSTEM FOR MACHINE TOOLS
Filed March 21, 1950 3 Sheets-Sheet 3
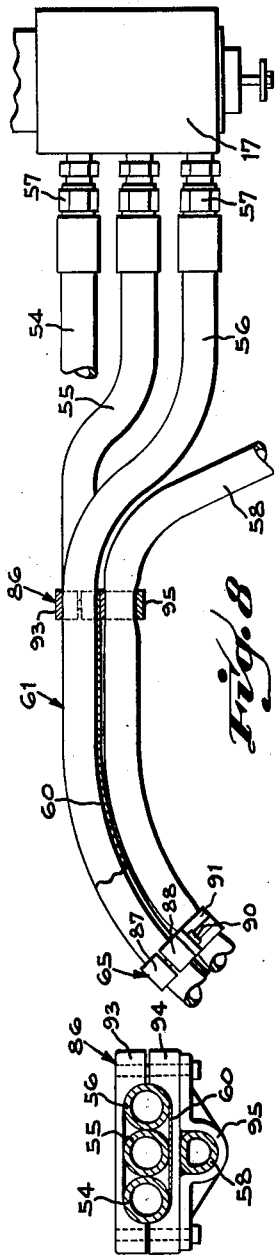
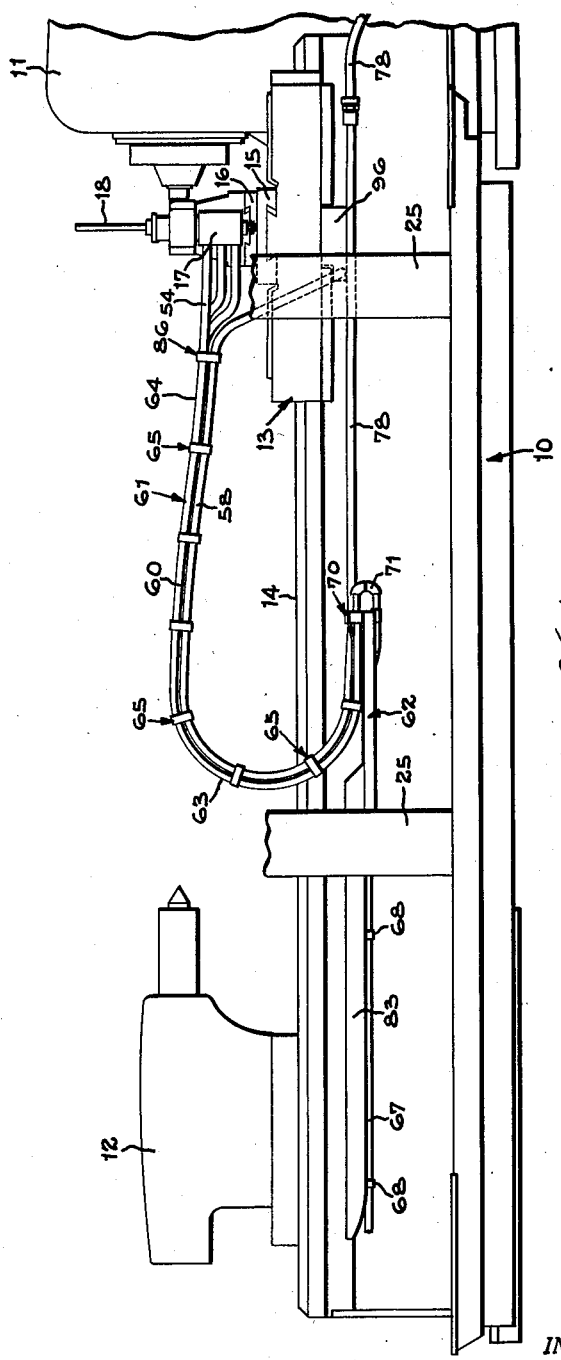
INVENTOR.
William G. Hoelscher
BY
Wood, Arey, Herron & Evans
ATTORNEYS.

Patented Feb. 9, 1954

2,668,557

UNITED STATES PATENT OFFICE 2,668,557

CONDUIT SYSTEM FOR MACHINE TOOLS

William G. Hoelscher, Cincinnati, Ohio, assignor to The American Tool Works Co., Cincinnati, Ohio, a corporation of Ohio Application March 21, 1950, Serial No. 151,021

5 Claims. (Cl. 138—61)

This invention relates to machine tools such as lathes having a bed and a translatable carriage movable longitudinally along the bed; and the invention resides particularly in a conduit or cable system for conducting fluid or electrical energy from a stationary point to the moving carriage.

Unless some form of conduit supporting apparatus is provided in machines of this type, especially those which involve extensive carriage travel, the pliable conductors leading to the carriage are apt to chafe and to suffer abrasions by friction and to snarl and kink, especially when the direction of carriage travel is reversed. There is danger also that the conduits may become snagged or entangled with the stationary parts of the machine during carriage movement and in this manner become torn or severely damaged.

A primary object of this invention has been to solve this problem by a simple but effective arrangement whereby one or more relatively limber conduits are placed in assembly with a coextensive flat spring to provide a vertically disposed cycloidal loop of controlled flexibility which follows the carriage movements with practically no resistance or conduit wear. The spring and conduit bundle thus formed is doubled over and is sufficiently resistant to bending to form a relatively large loop and to maintain the unsupported portion of the bundle in straight condition. The fixed ends of the conduits forming the bundle are connected to stationary supply pipes at a point intermediate the limits of carriage translation and this portion of the bundle rests upon a horizontal support surface extending toward one end of the bed. The opposite end of the bundle is connected to the carriage at an elevation well above the support surface and this portion extends horizontally above and parallel with the stationary lower portion, with a connecting loop between the upper moving portion and the lower stationary portion of the bundle. By this arrangement, there is no relative movement between the stationary support surface and the conduit bundle which rests upon it; consequently, there is no wear of chafing. Moreover, conduit wear due to bending at the loop as it rolls upon the supporting surface is substantially eliminated by the controlled flexibility of the bundle which governs the loop radius. This flexibility exists in the vertical direction only, while in the horizontal direction by reason of the flat spring, the bundle is relatively stiff to prevent lateral displacement and to guide the bundle in alignment with its supporting surface during carriage traverse.

In its preferred embodiment, the improved conduit structure is utilized to connect the tracer valve of a hydraulic duplicating lathe with the hydraulic pump unit which supplies the fluid pressure. In a duplicating lathe of this type, as hereinafter disclosed in greater detail, the carriage is provided with a cross slide upon which is mounted the cutting tool and tracer valve. The cross slide is actuated transversely of the carriage by a hydraulic cylinder which is connected to and controlled by the tracer valve. The tracer valve embodies a stylus which traces the profile of a template mounted parallel with the bed as the carriage is translated longitudinally and the valve is constructed and arranged to transmit hydraulic fluid to the hydraulic cylinder in response to stylus movements, whereby the profile of the template is reproduced by transverse movements of the cross slide and cutting tool; thus reproducing accurately the profile of the template in the rotating workpiece. A lathe of this type is disclosed in the co-pending application of Manual Turchan and William G. Hoelscher, Serial No. 767,920, filed August 11, 1947, now Patent No. 2,603,117.

In this co-pending machine, the headstock includes a speed change transmission for rotating the work at turning speed while the carriage is fed mechanically along the bed by means of the usual feed rod or lead screw. The feed rod and lead screw are driven by a feed box transmission in driving connection with the headstock transmission. In addition to this mechanical carriage feed for the cutting operation, the present lathe embodies an electrical traverse motor mounted on the carriage whereby the carriage can be translated rapidly in either direction in setting up the machine or in returning it to starting position by operation of a switch also mounted directly upon the carriage. The rapid traverse operation is particularly hazardous to conduit systems because of the rapidity of carriage movement and also requires an electrical conductor extending to the carriage to energize the motor; hence, the present structure is highly desirable for such equipment. The fluid pressure for actuating the cross slide is conducted to the tracer valve by means of the improved conduit system leading from a hydraulic supply unit which, in the present instance, is located at the tailstock end of the lathe. Electrical energy for powering the rapid traverse motor is conducted by a cable leading from the lathe bed to the carriage, this cable also being placed in the conduit bundle extending to the carriage. Hydraulic machines of this type are extremely sensitive and changes in hydraulic displacement are reflected in the work; hence, it is important that the hydraulic conduits be protected against sharp bends and kinking.

In its preferred embodiment, the conduits are placed side by side on one side of the flat spring and the electrical cable upon the opposite side with the conduits and cable clamped at intervals to the spring. This spring provides a certain resistance to bending which is augmented by the conduits and cable, which in and of themselves are incapable of supporting their own weight without sag. However, by anchoring the cables at intervals to the flat spring, a flexible beam effect is achieved, the axis of the conduits and cables being displaced laterally from the axis of the spring so that the conduits, cable and spring mutually react against one another to develop controlled flexibility. The conduits by their construction inherently provide a slight amount of elasticity and they are placed to the outside radius of the loop, causing them to stretch slightly across the loop to develop sufficient resistance to produce a loop of fairly large radius, thus preventing undue wear and fatigue and also preserving the volumetric displacement of the conduits to maintain the sensitivity of the machine. The self-supporting character of the bundle, thus is created by the differential resistance to stretching between the conduits and spring in addition to the stiffness of the spring itself.

In order to guide the conduit bundle laterally with respect to its supporting surface, the end of the flat spring is anchored securely to the support surface at the fixed end of the conduits. The spring, by virtue of its width, preserves the alignment of the portion of the supported bundle resting upon the support surface but permits the upper or unsupporting portion, which is connected to the tracer valve, to deflect sufficiently for transverse movements of the cross slide and valve.

Briefly, therefore, the bundled conduits, in cooperation with the supporting surface, provide predetermined resiliency in the vertical direction to form the rolling loop, and provides a high degree of resistance to horizontal deflection to maintain the alignment of the bundle with its supporting surface. By selecting a spring having sufficient bending resistance, combined with appropriate spacing of the clamps, the arrangement can be utilized to support and guide conduits or cables of any reasonable length. Although the structure is intended primarily for conducting hydraulic fluid from a stationary pumping unit to the mobile carriage of a lathe, it will be observed that the system is not limited to such usage but may be employed without substantial alteration to supply coolant and other fluids to the carriage or as an electrical cable system for general utility in establishing an electrical circuit between a stationary and movable part of a machine.

Further objects of the invention have been to provide an improved arrangement whereby the stationary end of the conductors and spring may be anchored jointly upon an end of the support surface, with the anchored ends of the conduits in fluid connection with distribution lines leading to the hydraulic supply unit; also, to provide devices for clamping together at intervals the conduits, cables and flat spring, which devices also provide a series of support bases which rest upon the support surface to aid in stabilizing the rolling bundle in a vertical position.

Further objects and advantages of the invention and various modifications of which it is capable will be more fully apparent to those skilled in the art from the specification and drawings disclosing a preferred embodiment.

In the drawings:

Figure 2 is an end elevation partially broken away, further illustrating the general arrangement of the apparatus with reference to the lathe.

Figure 3 is an enlarged fragmentary top plan view of the support channel and the associated conduit assembly or bundle.

Figure 4 is a side elevation projected from Figure 3 further detailing the structure.

Figure 5 is a sectional view taken on line 5—5, Figure 1, illustrating the junction block and pipe fittings connecting the stationary ends of the conduits to the supply lines at one end of the channel.

Figure 6 is a sectional view taken on line 6—6, Figure 1, detailing one of the clamping blocks for maintaining the conduits, cable and spring in assembled relationship upon the support channel.

Figure 7 is a sectional view taken on line 7—7, Figure 1, detailing the coupling block for maintaining the conduits, cable and spring in clamped relationship at the travelling end of the conduit assembly.

Figure 8 is an enlarged fragmentary side elevation taken from Figure 1, further illustrating the arrangement of the conduits at the tracer valve.

Figure 9 is a view similar to Figure 1 with certain parts removed, showing the position assumed by the conduit assembly when the carriage reaches its limit of travel at the headstock of the lathe.

Figure 1:
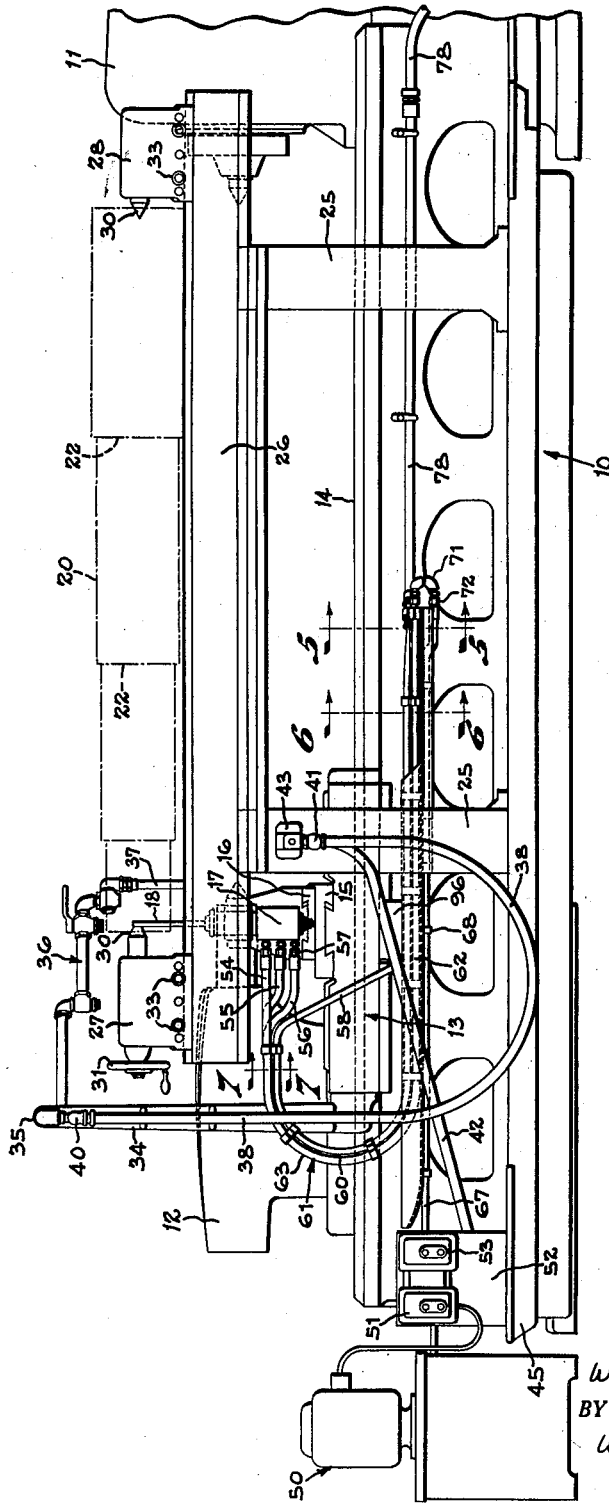
Figure 1 is a rear elevation of a duplicating lathe incorporating the improved conduit system.

Referring to Figure 1 illustrating generally the disposition and arrangement of the conduit system with reference to a lathe, the lathe bed is indicated generally at 10, the headstock at 11 and the tailstock at 12. The carriage, generally indicated at 13, is slidably mounted upon the ways 14 in the usual manner for translation relative to the work, and a tool slide 15 is slidably mounted upon the carriage for feeding the tool transversely with respect to the work. A slide 16 is mounted upon the tool slide for supporting the tracer valve assembly 17, the slide 16 being adjustable with respect to the tool slide so that the position of the valve may be adjusted relative to the tool which is mounted on the tool slide to determine the work diameter. The various details of this structure are not relevant to the present improvements and are disclosed in detail in the aforesaid co-pending application.

The tracer valve 17 includes a vertical finger 18 rising from the valve to a position to trace the profile of the template 20 (Figures 1 and 2), the vertical finger 18 having at its upper end a stylus 21 adapted to contact the surface of template 20. As the carriage 13 moves longitudinally upon the ways, the stylus 21 encounters the steps 22 of the template and trips the tracer valve to direct the flow of hydraulic fluid to a hydraulic cylinder assembly (not shown) which is mounted upon the carriage and connected to the tool slide so as to shift the tool slide laterally in a direction and distance corresponding to the steps of the template. Since the tool and tracer valve are mounted upon the tool slide, they are shifted unitarily in response to changes in template profile; therefore, the cutting tool follows accurately the profile of the template. The diameter of the workpiece is controlled by regulating the distance between the tool and stylus finger by virtue of the adjustable slide block 16; consequently, the work diameter is not dependent upon the diameter of the template but the steps 22 are reproduced accurately in the work independently of work diameter.

The template 20 is mounted at the rear of the lathe by a pair of vertical standards 25—25 having a horizontal rail 26 mounted at their upper ends. At opposite ends of rail 26, there is mounted a pair of centering fixtures 27 and 28 having tapered pins 30—30 similar to work centers and these engage holes drilled in ends of the template. The fixture 27 is provided with a handwheel 31 for adjustment purposes. The rail 26 includes a slideway 32 and the fixtures 27 and 28 are provided with clamping screws 33 permitting longitudinal adjustment of the fixtures and template with respect to the lathe centers.

The lathe carriage includes a vertical bracket 34, having a horizontal portion 35 extending rearwardly and overhanging the template (Figure 2). A coolant pipe assembly 36 consisting of a series of swivel joints and having a nozzle 37, is mounted upon the upper end of bracket 35 with the nozzle 37 in position to discharge coolant upon the workpiece at the cutting tool. The coolant is supplied by a flexible conduit 38 having its upper end connected by a swivel joint 40 to the pipe assembly 36. The opposite end of the conduit 38 is connected by a similar swivel joint 41 which is connected to a supply conduit 42, conduit 42 being connected to swivel joint 41 by means of a stationary junction block 43 mounted upon one of the standards 25. The coolant is circulated by a motor driven pump unit 44 having an intake communicating with the sump 45 at the base of the lathe bed so as to recirculate the coolant discharged by nozzle 37. The flexible conduit 38 is looped, as shown in Figure 1, to provide a sufficient length of cable to permit the pipe section 36 to traverse the lathe bed along with the carriage and the respective swivel joints 40 and 41 compensate for relative movement at the ends of cable 38 during translation.

The structure so far described follows substantially the general practice relating to duplicating lathes and the conduit arrangement supplies the coolant but forms no part of the hydraulic control system for the tracer valve. As shown in Figure 1, hydraulic fluid is conducted to the duplicating valve 17 by means of a hydraulic pump unit 50 mounted adjacent the tailstock end of the lathe. This unit is a commercial structure powered by an electric motor and arranged to supply hydraulic fluid at predetermined pressure and volume suitable to actuate the cylinder assembly for shifting the tool relative to the work at a fixed rate. For this purpose, the unit is provided with automatic valving apparatus which bypasses the fluid within the pump unit when the flow is blocked at the tracer valve and which provides a controlled flow of fluid to operate the cylinder assembly in the appropriate direction in accordance with the movements of the tracer valve. The operation of the hydraulic pump unit is regulated by the switch 51 mounted upon the panel 52 and a switch 53 for controlling the coolant pump motor 44 also is mounted upon this panel.

Fluid pressure is conducted from the pump unit 50 to tracer valve 17 at the rear of the lathe by way of the pliable conduit 54 and the return flow is conducted back to the pump unit by way of conduit 55. In addition, the valve is provided with a third conduit 56 to conduct back to the pump unit 50 fluid which may leak through the ports of the valve. These three conduits consist of pliable tubing commonly used in hydraulic systems, such as commercial rubber tubing suitably reenforced to withstand the hydraulic pressure. Such tubing will bend readily and will stretch slightly under tension and is well adapted to be placed in assembly with the flat spring to provide a bundle having controlled flexibility. The ends of the conduits are connected to the tracer valve 17 by means of screw threaded couplings 57 also of commercial design. In the present disclosure, there is provided in addition to the three conduits leading to the tracer valve, an electrical cable 58 for conducting energy from a power line mounted on the lathe bed to the traverse motor of the carriage.

The three conduits 54, 55 and 56 and the electric cable 58 are combined with the coextensive flat spring 60 to form a bundle which is indicated generally at 61. By way of example, spring 60 may be formed from a normally straight strip of tempered spring steel approximately $\frac{1}{16}$" thick and 2" wide, but it will be apparent that the material and dimensions will be varied in accordance with the weight and length of the conduits and other variable factors. One end of the bundle is secured to the stationary channel 62 which extends from the tailstock end approximately to the center of the lathe bed to support the conduit bundle with the opposite ends of the conduits anchored and connected respectively to the tracer valve and channel. In the position shown in Figure 1, with the carriage at the tailstock end of the bed, the major portion of the conduit bundle is supported upon the channel and its leading end loops upwardly as at 63 to the valve. In the position shown in Figure 9, the carriage is at the headstock and the major portion of the bundle spans substantially without sag from the rolling loop 63 to the valve, as indicated at 64. When clamped in assembly with the flat spring 60, a sufficient degree of stiffness is developed to render the group of conduits self-supporting so that the portion 64 extending from the valve maintains itself substantially in a horizontal position; at the same time, the slight elasticity of the tubing provides controlled flexibility for the formation of the rolling loop 63. For this purpose, the conduits are disposed upon the outside radius of the loop and are clamped to the flat spring at spaced intervals by clamping blocks 65 which are formed preferably from aluminum for lightness. The elasticity of the conduits combined with the resistance to bending of the spring strip 60 renders the bundle sufficiently resistant to bending to form the desired loop configuration. By this arrangement, the assembled bundle of conduits rolls upon the support channel 62 during the traverse of the carriage eliminating kinking, excessive wear and entanglement of the cables.

Described in detail, the fluid pressure is conducted from the hydraulic pump unit by way of conduits or pipes 67 which are secured to the undersurface of channel 62 by means of U- shaped clips 68 (Figure 6). In the present instance, there is provided a set of three pipes 67, these being in connection respectively with the conduits 54, 55 and 56 by way of the terminal block 70 mounted at the inner end of channel 62. Since the supply conduits 67 are not subjected to a bending action, they may be formed either from flexible tubing or they may consist of rigid metal pipes. The respective conduits 67 are connected to the respective flexible conduits by means of return pipe fittings or elbows 71 having pipe couplers 72—72 at opposite ends for establishing a fluid tight connection. The upper pipe couplers 72 are supported by means of the junction block 70 (Figure 5) which consists of a pair of clamping blocks 73—73 in clamping engagement with the couplers 72 by means of screws 74 passing into a block 75 located beneath the channel. The upper coupling block is further provided and an eye fitting 76 for anchoring the end of the electrical cable 58. The cable is clamped to the fitting by means of nuts 77—77 and, as shown in Figures 3 and 5, a stationary power cable 78 is secured to the lathe bed at the rear thereof and has its end connected to the rolling cable 58 by way of the eye fitting.

The channel 62, as detailed in Figures 3 and 4, is fabricated preferably from sheet metal and constitutes an elongated unit extending from the tailstock end approximately to the longitudinal center of the bed. The channel is mounted in cantilever fashion upon a lateral base extension of the left-hand standard 25 as viewed in Figure 1 for which purpose the channel includes a pair of mounting bars 79—79, preferably welded to the base plate 80 of the channel. The mounting bars 79 are secured to the standard 25 by means of the screws 81. Since the channel extends for a substantial distance in opposite directions from the member 25, it is stiffened by longitudinal base ribs 82—82 extending to the right as viewed in Figure 4. These ribs are fabricated from sheet metal and preferably are welded to the base plate 80 along opposite sides, as shown in Figures 5 and 6. The left-hand portion of the channel is stiffened by the vertical side walls 83—83 which extend upwardly from base plate 80 and serve to a certain extent to prevent lateral displacement of the conduit bundle with reference to the channel. The left-hand end of the rail is curved upwardly as at 84 conforming to the contour of loop 83 when the carriage occupies its tailstock position.

The flat spring 60 has its stationary end anchored by screws 85—85 to the terminal block 70, as shown in Figures 3 and 5. As shown in Figure 6, the spring overlies the conduits 54, 55 and 56, and the cable 58 overlies the spring and the assembly is clamped in grouped formation by the clamping blocks 65 which are mounted at spaced intervals along the bundle, as above noted. The leading end of the flat spring is anchored to a clamping block indicated at 86 in Figures 7 and 8 adjacent the tracer valve. The clamping blocks 65 are detailed in Figure 6, each block constituting a lower element 87 and an upper element 88 secured in clamping engagement with the spring and conduits by screws 90—90. Upon the upper element 88 there is mounted a cable clamp 91 of inverted V-shape which is also traversed by the clamping screw 90 so as to maintain the entire assembly in bundled formation. As shown, the elements 87 and 88 are provided with complementary recesses 89 to receive the cables 54, 55 and 56 in side-by-side relationship and the blocks rest upon the base plate 80 to stabilize that portion of the conduit bundle which rests upon the plate. The channel is sufficiently wide to permit the bundle to shift laterally upon it as the tool slide and tracer valve are shifted transversely.

As shown in Figures 7 and 8, the clamping assembly 86 which forms the terminal clamp at the leading end of the bundle, also consists of respective sections 93, 94 and 95 for the conduits and cable respectively. The flat spring 60 is anchored permanently to the section 94 for example by brazing, and the respective conduits branch from this point to the couplings of the valve in the manner disclosed in Figure 8. The electric cable 58 also passes from the block downwardly to its junction block 96 (Figure 2) which is secured to the overhanging portion of the carriage at the rear of the carriage. The wires of the cable pass from the junction block through pasageways formed in the carriage for this purpose and are interconnected with the carriage traverse motor and control switch.

As previously noted, the carriage rapid traverse motor permits the carriage to be shifted rapidly along the bed independently of the feed rod and apron gear train. The traverse motor is of the reversible type and a traverse switch mounted on the carriage is interconnected between the cable and motor and is provided with contacts adapted to energize the motor in forward and reverse directions. This permits the operator to traverse the carriage rapidly to a desired position when the carriage is being set up or repositioned for a cutting operation. During the actual turning operation, however, the carriage is fed along the bed by the feed rod or lead screw in accordance with the feed requirements of the job. The mechanical driving apparatus for this purpose and the structural arrangement of the rapid traverse motor does not form an essential part of the present invention and, therefore, is not disclosed.

By virtue of the flat spring 60 which has its end firmly anchored upon the channel in a horizontal position, a high resistance to lateral displacement is imparted to the bundle of conduits. In other words, the flat spring is highly resistant to lateral flexing to maintain the lateral position of the bundle while, at the same time, it provides a desirable yieldability in the vertical plane which is just sufficient in combination with the elasticity of the conduits to form the necessary loop and to sustain the run extending from the loop to the valve in a horizontal plane, with little or no sag as illustrated. The resistance to movement is relatively slight and the arrangement eliminates completely the effect of dragging the conduits relative to a supporting surface and attendant wear. By virtue of the loop arrangement, the cable length for a given range of carriage travel is approximately one-half the travel range plus the length of the looped portion. Thus, the conduits extend directly to the valve and are devoid of sharp turns, reducing flow resistance in the circuit. Partial kinking of the conduits which may effect the volumetric displacement of the system and interfere with the sensitivity of the tracer apparatus also are prevented by the controlled radius of the loop. Thus, the improved arrangement contributes especially to the performance of machines which depend for precision upon a metered fluid pressure supply which must be free of surges. Although the improved structure is shown and described in conjunction with a lathe, it will be apparent that the same structure may be applied to various other machines which embody a moving part having cables or conduits which must be guided and supported relative to a stationary part.

Having described by invention, I claim:

1. A conduit system comprising, a plurality of pliable conduits, a flat normally straight spring substantially coextensive with the conduits, the conduits providing a bundle in assembly with the flat spring on one side thereof, a plurality of clamping elements disposed at spaced intervals longitudinally of the bundled conduits and spring, each of the clamping elements constituting a pair of blocks of substantial length extending transversely of the bundled conduits and spring, one of the blocks of each clamping element extending across and being in contact with the flat spring and being secured permanently thereto, the other of said blocks being detachably secured to the first, the said blocks having complementary recesses adapted in assembly to receive the conduits in clamped engagement against the flat spring, the assembled spring and conduit bundle being doubled over to provide a flexible U-shaped rolling loop having an upper and lower limb, an elongated horizontal support member adapted to sustain the lower of said limbs, said clamping elements being adapted to seat upon the support member and arranged to stabilize the loop in vertical position with respect to the support member, the end of said lower limb being connected to a stationary fitting mounted upon the support member, the end of said upper limb being adapted to be connected to a horizontally movable element located above the support member whereby the rolling loop provides a conductor extending from the fitting to the movable element.

2. A conduit system comprising, a plurality of pliable conduits located alongside one another, a flat normally straight spring substantially coextensive with the conduits, the conduits providing a bundle in assembly with the flat spring on one side thereof, the spring having a width substantially equal to the plurality of conduits, a plurality of clamping elements disposed at spaced intervals longitudinally of the bundled conduits and spring, each of the clamping elements constituting a pair of blocks of substantial length extending transversely of the bundled conduits and spring, one of the blocks of each clamping element extending across and being in contact with the flat spring and the other of said blocks being detachably secured to the first with the conduits in clamped engagement against the flat spring, the assembled spring and conduit bundle being doubled over to provide a flexible U-shaped rolling loop having an upper and lower limb, an elongated horizontal support member adapted to sustain the lower of said limbs, said clamping elements being adapted to seat upon the support member and arranged to stabilize the loop in vertical position with respect to the support member, and a terminal block mounted upon said support member adapted to clampingly engage the conduits at the end of said lower limb, the flat spring having an end anchored rigidly upon said terminal block above the conduits to maintain the rolling loop in alignment with the elongated support member.

3. A conduit system comprising an elongated pliable conduit, a flat normally straight spring having a substantial width, said spring being substantially coextensive with said conduit, said conduit being engaged against the flat surface of said spring, a plurality of clamping elements disposed at spaced intervals longitudinally of the coextensive conduit and spring, said clamping elements engaging said conduit and spring at opposite sides and clamping the conduit against the flat surface of the spring, the assembled spring and conduit being doubled upon itself to provide a flexible U-shaped rolling loop having an upper and lower limb, said loop being disposed in a vertical plane whereby the flat spring is adapted to impart flexibility to the loop vertically and stiffness to the loop horizontally, an elongated horizontal support member adapted to sustain the lower of said limbs, a stationary fitting mounted upon the support member, the end of the conduit of said lower limb being connected to said stationary fitting, and means anchoring the end of the flat spring rigidly to said stationary fitting, whereby the flat spring is adapted to guide the loop longitudinally with respect to the elongated support surface, the end of the conduit of said upper limb being adapted to be connected to a horizontally movable element located above the support member whereby the rolling loop provides a conductor extending from the fitting to the movable element.

4. A conduit system comprising a plurality of pliable conduits, a flat normally straight spring having a substantial width, said spring being substantially coextensive with the conduits, the conduits being disposed upon the flat surface of the spring, a plurality of clamping elements disposed at spaced intervals longitudinally of the conduits and spring, said clamping elements being adapted to clamp the conduits and spring against longitudinal and transverse displacement with respect to one another with the axes of the conduits disposed outwardly from the flat surface of the spring, the said spring and conduit being doubled upon itself to provide a flexible U-shaped rolling loop disposed in a vertical plane and having upper and lower parallel limbs, the conduits being disposed upon the exterior of the loop and adapted to react in tension against the spring to stiffen the loop, an elongated horizontal support member adapted to sustain the lower of said limbs, a stationary fitting mounted upon the support member, the ends of the conduits of said lower limb being connected to said stationary fitting, the ends of the conduits of said upper limb being adapted to be connected to a horizontally movable element located above the support member, whereby the rolling loop provides a conductor extending from the stationary fitting to the movable element.

5. A conduit system comprising a plurality of pliable conduits, a flat normally straight spring substantially coextensive with the said conduits, the conduits being disposed on opposite sides of the flat spring, a plurality of clamping elements disposed at spaced intervals longitudinally of the conduits and spring, each of said clamping elements constituting a pair of blocks extending transversely of the conduits and spring, one of said blocks of each clamping element being secured to the flat spring, the other of said blocks being detachably secured to the first block, said blocks being configurated to clamp the conduits and spring in assembly, the assembled spring and conduit being doubled upon itself to provide a flexible U-shaped rolling loop disposed in a vertical plane and having an upper and lower limb, and elongated horizontal support member adapted to sustain the lower of said limbs, said clamping elements being adapted to seat upon the support member, a stationary fitting mounted upon the support member, the ends of the conduits of said lower limb being connected to said stationary fitting, and means anchoring the end of the flat spring rigidly to said stationary fitting, whereby the spring is adapted to guide the rolling loop in alignment with the elongated support surface, the ends of the conduits of said upper limb being adapted to be connected to a horizontally movable element located above the support member whereby the rolling loop provides a conductor extending from the fitting to the movable element.

WILLIAM G. HOELSCHER.

References Cited in the file of this patent

UNITED STATES PATENTS

| Number | Name | Date |
|---|---|---|
| 124,897 | Honsinger | Mar. 26, 1872 |
| 805,579 | Patchen | Nov. 28, 1905 |
| 919,986 | Whitney | Apr. 27, 1909 |
| 1,089,642 | Honold | Mar. 10, 1914 |
| 1,126,673 | Johnson | Jan. 26, 1915 |
| 1,371,981 | Rose | Mar. 15, 1921 |
| 1,566,184 | Earley | Dec. 15, 1925 |
| 1,791,270 | Groene | Feb. 3, 1931 |
| 2,170,557 | Guarneschelli | Aug. 22, 1939 |
| 2,175,662 | Guarnaschelli | Oct. 10, 1939 |
| 2,177,128 | Johnson | Oct. 24, 1939 |
| 2,206,703 | Lowe | July 2, 1940 |
| 2,277,864 | Horvath | Mar. 31, 1942 |
| 2,370,032 | Groen | Feb. 20, 1945 |
| 2,475,326 | Johnson | July 5, 1949 |